May 30, 1961   E. V. HARDWAY, JR   2,986,615
ACCELERATION RESPONSIVE DEVICE
Filed May 20, 1957
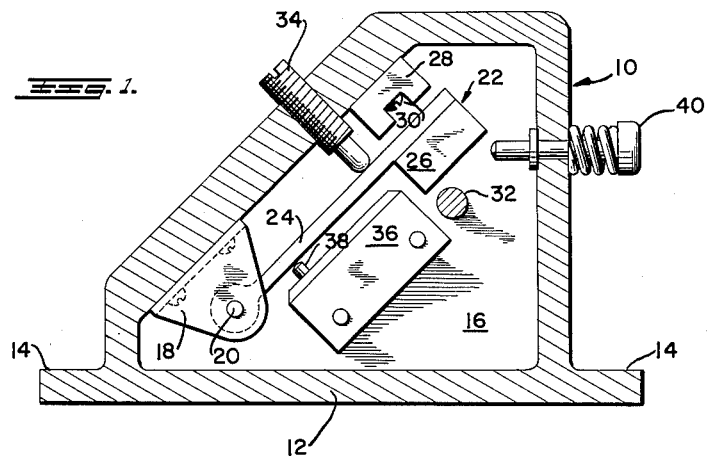
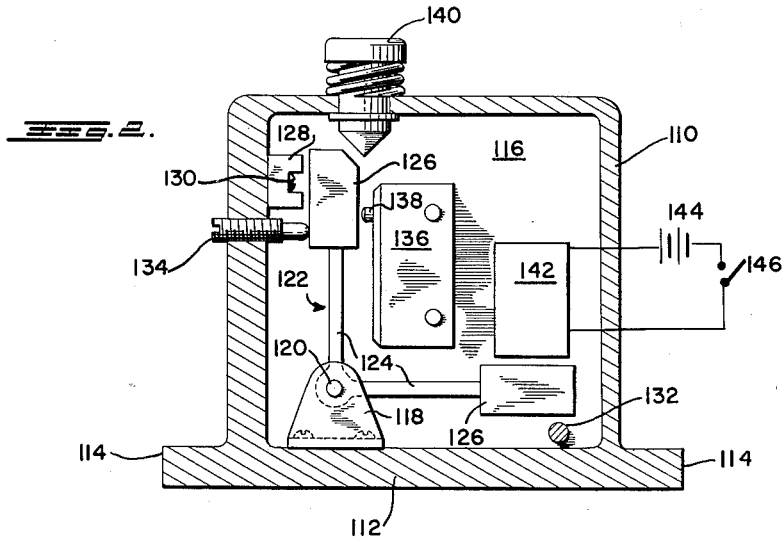
INVENTOR
EDWARD V. HARDWAY JR.
BY Mead, Browne, Schuyler &
Beveridge
ATTORNEYS & # United States Patent Office 2,986,615
Patented May 30, 1961

2,986,615
ACCELERATION RESPONSIVE DEVICE
Edward V. Hardway, Jr., Radnor, Pa., assignor to Robertshaw-Fulton Controls Company, Richmond, Va., a corporation of Delaware
Filed May 20, 1957, Ser. No. 660,371
4 Claims. (Cl. 200—61.45)

This invention relates to acceleration responsive devices and more particularly to such a device in which an inertia system is subjected to opposed gravitational and magnetic forces.

One field in which devices of this class find utility is that of vibration detection. The usual arrangement employs an inertia element which may be suspended or maintained in a "ready" position by the forces of a magnetic couple. When the device is subjected to vibrations of a sufficient magnitude, the inertia element is accelerated in a manner to overcome the restraining action of the magnetic couple and travel to a second position. The motion or movement of the inertia element to the second position may be employed to actuate an indicating or corrective circuit by causing the inertia element to directly or indirectly actuate appropriate electrical contacts.

In prior devices, a problem frequently encountered is that of variance of field strength in the permanent magnets employed for establishing the magnetic couple. In many prior art constructions, the sensitivity of the device is dependent upon the strength of the magnet in such a manner that it is extremely difficult to standardize sensitivity between units. Where provision for sensitivity adjustment is present, consistent results from a given sensitivity setting, while theoretically possible, cannot be achieved in practice.

It is a major object of the invention to provide a simplified acceleration responsive device in which biasing springs are eliminated by utilizing gravity as the biasing force opposing the magnetic force exerted on the inertia element.

In the attainment of this and other objects, an inertia element is supported by a substantially frictionless single degree of freedom mounting restraining movement of the element to a single plane relative to its base or support. A magnetic couple is employed to exert a force tending to move the element toward an abutment or stop. The inertia element has its mass so arranged on its mounting that gravity exerts a force tending to move the element away from the stop. By adjustment of the stop to vary the air gap of the magnetic couple the difference between the magnetic and gravitational forces may be selected so the element is triggered at a selected level of acceleration.

Other objects and advantages of my invention will become readily apparent by reference to the following detailed description taken in conjunction with the accompanying drawings.

In the drawings:
Fig. 1 is a cross-sectional view of one embodiment of my invention; and
Fig. 2 is a cross-sectional view of a second embodiment of my invention.

Referring first to Fig. 1, I have shown in cross section a device which includes a rigid frame or casing 10 having a base 12. Base 12 may be provided with flanges 14 for fixedly mounting casing 10 to the frame of a machine or test structure (not shown). As shown in Fig. 1, casing 10 has a compartment 16 which may be closed by a suitable cover plate.

A magnetically responsive inertia element generally designated 22 is supported upon pivot pin 20 journaled in lugs 18 fixed to base 12. This element includes a rigid arm member 24 having a mass 26 fixed to its distal end. Inertia element 22 is constructed to be sufficiently rigid to constrain element 22 to a single degree of freedom movement with respect to casing 10 about the axis of pin 20. One or both of arm member 24 and mass 26 are constructed of a ferromagnetic substance.

A permanent magnet 28 is mounted upon casing 10 as by bolt 30 at a location above pivot pin 20 where it may establish a magnetic couple between casing 10 and inertia element 22 acting in a direction opposed to the action of the gravitational forces which tend to rotate inertia element 22 in a clockwise (Fig. 1) direction about pivot pin 20.

Pivotal movement of inertia element 22 about pivot pin 20 is limited in one direction by a fixed stop 32 mounted on casing 10 and in the other direction by an adjustable abutment or stop which may take the form of a set screw 34 threaded in a wall of casing 10.

A snap switch 36 is mounted within casing 10 at a location where its striker 38 may be actuated by arm 24 during its movement toward stop 32.

A manual reset button 40 is mounted upon casing 10 at a location where it may be employed to manually move inertia element 22 from an actuated position adjacent stop 32 into the ready position against stop 34.

If the device is mounted so base 12 is located in a horizontal plane, as shown in Fig. 1, the gravitational force acting upon inertia element 22 tends to rotate the inertia element about pivot pin 20 in a clockwise direction as shown in Fig. 1. The magnitude of the gravitational force at any angular position of arm 24 is equal to the mass of inertia element 22 multiplied by the effective lever arm of the center of mass element 22 about pivot pin 20. The effective lever arm is equal to the radial distance between pivot pin 20 and the center of mass of element 22 and the cosine of the vertical angle between a line connecting pivot pin 20 and the center of mass and a horizontal plane containing pivot pin 20 i.e. the horizontal displacement of the center of mass of element 22 from the axis of pivotal movement.

The force of magnetic attraction exerted upon inertia element 22 by magnet 28 varies directly with the pole strength of magnet 28 and inversely as the square of the distance separating magnet 28 and inertia element 22.

In the embodiment disclosed in Fig. 1, the pole strength of magnet 28 and the mass of inertia element 22 are selected so that the forces exerted by magnet 28 and the opposed gravitational forces acting upon inertia element 22 will be in equilibrium at some position of inertia element 22 within the range of movement of element 22 defined by stops 32 and 34. This position of inertia element 22 is at the critical distance of the magnetic couple. The critical distance is obviously dependent upon the strength of magnet 28 and the mass of inertia element 22. However, in the disclosed constructions, the only design requirement of the critical distance is that it be greater than zero and less than the distance between magnet 28 and inertia element 22 when the inertia element is on stop 32. Therefore, the mass of element 22 and the strength of magnet 28 need not be precisely regulated. By adjusting screw 34, a "ready" position of inertia element 22 may be established at various locations within the critical distance. Because the magnetic forces acting on element 22 vary in the manner stated above and the gravitational forces are essentially constant (slight variation due to changing lever arm) over the range of movement of element 22, the net force holding element 22 against screw 34 is easily varied. External forces, such as vibrations or transient shock loads, applied to casing 10 will influence the net force acting on element 22 and if such an external force exerts a component sufficient to overcome the net holding force, element 22 will move beyond the critical distance and be gravitationally attracted to stop 32.

*Operation of Fig. 1 embodiment*

The operation of the Fig. 1 embodiment will be described with relation to an environment in which the disclosed device is used to detect an undesirable amount of vibration in a machine, for example, a cooling tower fan. In such an environment, the device of Fig. 1 will be clamped or bolted to the base plate or gear box of the fan and snap switch 36 will be connected, through suitable actuating relays, to control the energizing circuit of the fan. Adjustable stop 34 will be backed off to provide a minimum air gap between magnet 28 and inertia element 22 and inertia element 22 will be moved into abutment with adjustable stop 34 by manual actuation of reset button 40. In this position, the connections of the circuit including snap switch 36 will be such that the fan will be energized. With the fan in operation, adjustable stop 34 is turned to push inertia element 22 away from magnet 28 toward the equilibrium point at which the gravitational forces acting upon inertia element 22 will overcome the force of the magnetic couple exerted. Adjustment of screw 34 is continued until the normal vibration created by the operation of the fan imparts sufficient acceleration to inertia element 22 to break the magnetic couple, thus alloying inertia element 22 to rotate clockwise as viewed in Fig. 1 under the action of gravity to actuate snap switch 36 and thus break the fan energizing circuit.

Adjustable stop 34 is then backed off a slight amount and inertia element 22 is moved back into abutment with stop 34 by reset button 40, thus allowing the fan to be energized again. With this setting of adjustable stop 34, the acceleration responsive device will permit continued operation of the fan under normal conditions. Should undesirable vibrations be set up, as by undue bearing wear or incipient blade failure, the increased vibrations will impart a sufficient acceleration to inertia element 22 to accelerate the element beyond the equilibrium point, break the magnetic couple and thus actuate snap switch 36 to shut down the fan before complete breakdown occurs.

From the foregoing description of one mode of operation of the device, it can be seen that the sensitivity of the device may be readily adjusted with a fine degree of accuracy. The manner in which the sensitivity adjustment is made requires only an approximate relationship between the strength of magnet 28 and the mass of inertia element 22. The actual equilibrium point of the system is readily established during the actual operation of the device and hence automatically takes into account the normal accelerations encountered in the environment in which the device is to be used. The particular construction employed in Fig. 1 is readily adapted to operate within a completely closed compartment 16, thus preventing stray metal particles from being attracted to magnet 28, a problem of some importance in metal working machinery applications.

The embodiment of the invention disclosed in Fig. 2 of the drawing is, in many respects, similar to that shown in Fig. 1. As in Fig. 1, the Fig. 2 embodiment includes a frame or casing 110 having a base plate 112 which includes projecting flanges 114. As in the Fig. 1 embodiment, casing 110 defines a compartment 116 which may be completely closed by the employment of a suitable cover plate (not shown). An upstanding lug assembly 118 serves to support a pivot pin 120 within the interior of casing 110.

A modified form of inertia element 122 includes a pair of rigid arms 124 mounted for pivotal movement upon pin 120. Each of the arms 124 is provided with a mass element 126 at the end of arm 124 remote from pivot pin 120. A permanent magnet 128 is mounted upon casing 110 at a location where magnet 128 may establish a magnetic couple between inertia element 122 and casing 110. As in the Fig. 1 embodiment, magnet 128 is permanently fixed to frame 110 as by a bolt 130.

Pivotal movement of inertia element 122 about pivot pin 120 is limited by a fixed stop 132 and an adjustable stop 134. Snap switch 136 is mounted in the interior of compartment 116 at a location where the snap switch striker 138 may be actuated by clockwise movement of inertia element 122 under the influence of gravity. As in the Fig. 1 embodiment, a spring pressed reset button 140 is mounted in a wall of casing 110 at a location where it may be actuated to manually reset inertia element 122 against adjustable stop 134.

In addition to manual reset button 140, the Fig. 2 embodiment of the device is provided with an electrical reset means which may take the form of a solenoid coil 142 mounted within casing 110 at a location where it may induce counter-clockwise rotation of inertia element 122 when solenoid coil 142 is energized. It will be understood that both mass elements 126 of the Fig. 2 embodiment will be constructed of a suitable magnetic substance. Solenoid coil 142 may be connected in series with a suitable battery 144 and switch 146 or other appropriate means for selectively energizing the solenoid coil.

The operation of the Fig. 2 embodiment is substantially similar to that described in connection with the embodiment of Fig. 1. As will be apparent from an inspection of the drawing, the Fig. 2 embodiment can of course be reset either by actuation of manual reset button 140 or by the energization of solenoid coil 142 as by closing switch 146.

While I have described but two embodiments of my invention, it will be readily apparent to those skilled in the art that the specific embodiments described above are capable of modification. Therefore, the described embodiments are to be considered exemplary rather than limiting and the true scope of my invention is that defined in the following claims. As employed in the following claims, the term "critical distance" refers to the distance between the magnet and a point at which the resultant of the magnetic and gravitational forces acting upon the inertia element is zero.

What I claim is:

1. An acceleration responsive control device comprising a frame, a fixed pivot carried by said frame, an inertia element rotatably mounted on said pivot and constrained to a single degree of freedom of rotative movement about a horizontal axis between a set position and a release position, said element having its center of mass horizontally and vertically displaced from said axis urging said element by gravity about said pivot toward said release position, a magnetic couple having one part on said element and one part on said frame exerting a force having an upward component urging said element toward said set position, an abutment on said frame for engaging said element to limit its upward movement in said set position with the parts of the magnetic couple separated by an air gap, said magnetic couple having sufficient strength to exert a force greater than the gravitational force when said element is in said set position in engagement with said element to retain said abutment in said set position and release said element to be moved by gravity to said release position when an acceleration force exceeds the differential between said magnetic and gravitational forces, and switch means positioned on said frame to be actuated by movement of said element from said set position to said release position.

2. An acceleration responsive device comprising a frame, a fixed pivot carried by said frame, an inertia element rotatably mounted on said pivot and constrained to a single degree of freedom of rotative movement about a horizontal axis between a set position and a release position, said element having its center of mass horizontally and vertically displaced from said axis so gravity urges said element about said pivot toward said release position, a magnetic couple having one part on said element and one part on said frame exerting a force having an upward componet urging said element toward said set position, an abutment on said frame for engaging said element to limit its upward movement in said set position with the parts of the magnetic couple separated by an air gap, means for shifting said abutment relative to said frame to vary the air gap between the parts of the magnetic couple and thereby change the force exerted by said magnetic couple when said element is in said set position, said magnetic couple having sufficient strength to exert a force greater than the gravitational force when said element is in said set position in engagement with said abutment to retain said element in said set position and release said element to be moved by gravity to said release position when an acceleration force acting on said element exceeds the differential between said magnetic and gravitational forces, and switch means positioned on said frame to be actuated by movement of said element from said set position to said release position.

3. An acceleration responsive control device comprising a frame, a fixed pivot carried on said frame, an inertia element rotatably mounted on said pivot and constrained to a single degree of freedom rotative movement about a horizontal axis between a set position and a release position, said element having its center of mass horizontally and vertically displaced from said axis urging said element by gravity about said pivot toward said release position, a magnetic couple having one part on said element and one part on said frame exerting a force having an upward component urging said element toward said set position, an abutment on said frame limiting upward movement of said element in said set position with the parts of the magnetic couple separated by an air gap, means for moving said element to said set position in engagement with said abutment, said magnetic couple having sufficient strength to exert a force greater than the gravitational force when said element is in said set position in engagement with said abutment to retain said element in said set position and release said element to be moved by gravity to said release position when an acceleration force exceeds the differential between said magnetic and gravitational forces, and switch means positioned on said frame to be actuated by movement of said element from said set position to said release position.

4. An acceleration responsive control device comprising a frame, a fixed pivot carried by said frame, an inertia element rotatably mounted on said pivot and constrained to a single degree of freedom of rotative movement about a horizontal axis between a set position and a release position, said element having its center of mass horizontally and vertically displaced from said axis urging said element by gravity about said pivot toward said release position, a magnetic couple having one part on said element and one part on said frame exerting a force having an upward component urging said element toward said set position, an abutment on said frame limiting upward movement of said element in said set position with the parts of the magnetic couple separated by an air gap, means for shifting said abutment relative to said frame to vary the air gap between the parts of the magnetic couple and thereby change the force exerted by said magnetic couple when said element is in said set position, means for moving said element to said set position in engagement with said abutment, said magnetic couple having sufficient strength to exert a force greater than the gravitational force when said element is in said set position in engagement with said abutment to retain said element in said set position and release said element to be moved by gravity to said release position when an acceleration force exceeds the differential between said magnetic and gravitational forces, and switch means positioned on said frame to be actuated by movement of said element from said set position to said release position.

References Cited in the file of this patent

UNITED STATES PATENTS

| | | |
|---|---|---|
| 1,154,396 | Hayot | Sept. 21, 1915 |
| 2,280,114 | Athy | Apr. 21, 1942 |
| 2,643,871 | Warrick | June 30, 1953 |
| 2,671,202 | Petroff | Mar. 2, 1954 |
| 2,672,334 | Chenery | Mar. 16, 1954 |
| 2,747,041 | Thomson | May 22, 1956 |
| 2,774,062 | Lin | Dec. 11, 1956 |
| 2,868,611 | Carleton | Jan. 13, 1959 |

FOREIGN PATENTS

| | | |
|---|---|---|
| 394,829 | Germany | May 3, 1924 |
| 409,095 | Germany | Feb. 2, 1925 |
| 446,230 | Great Britain | Apr. 27, 1936 |